Patented July 31, 1945

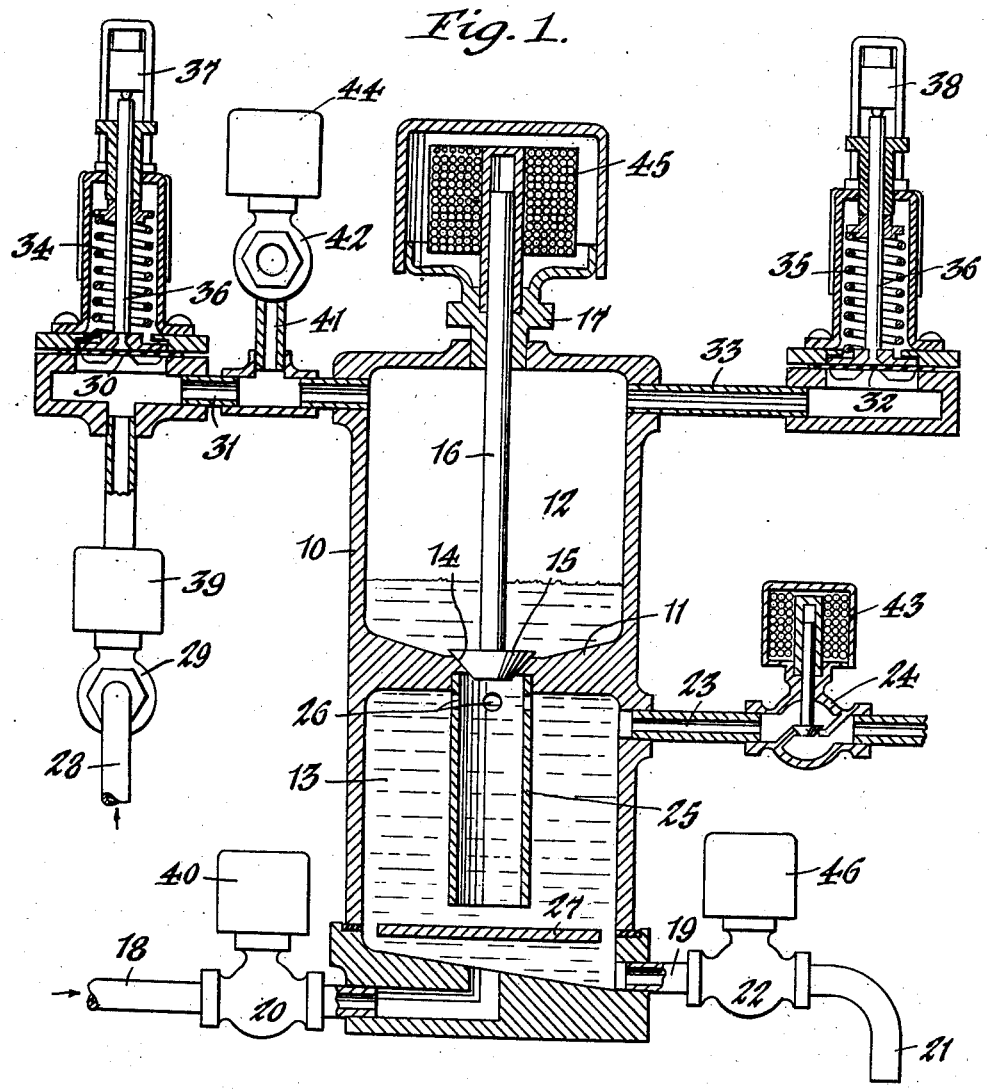

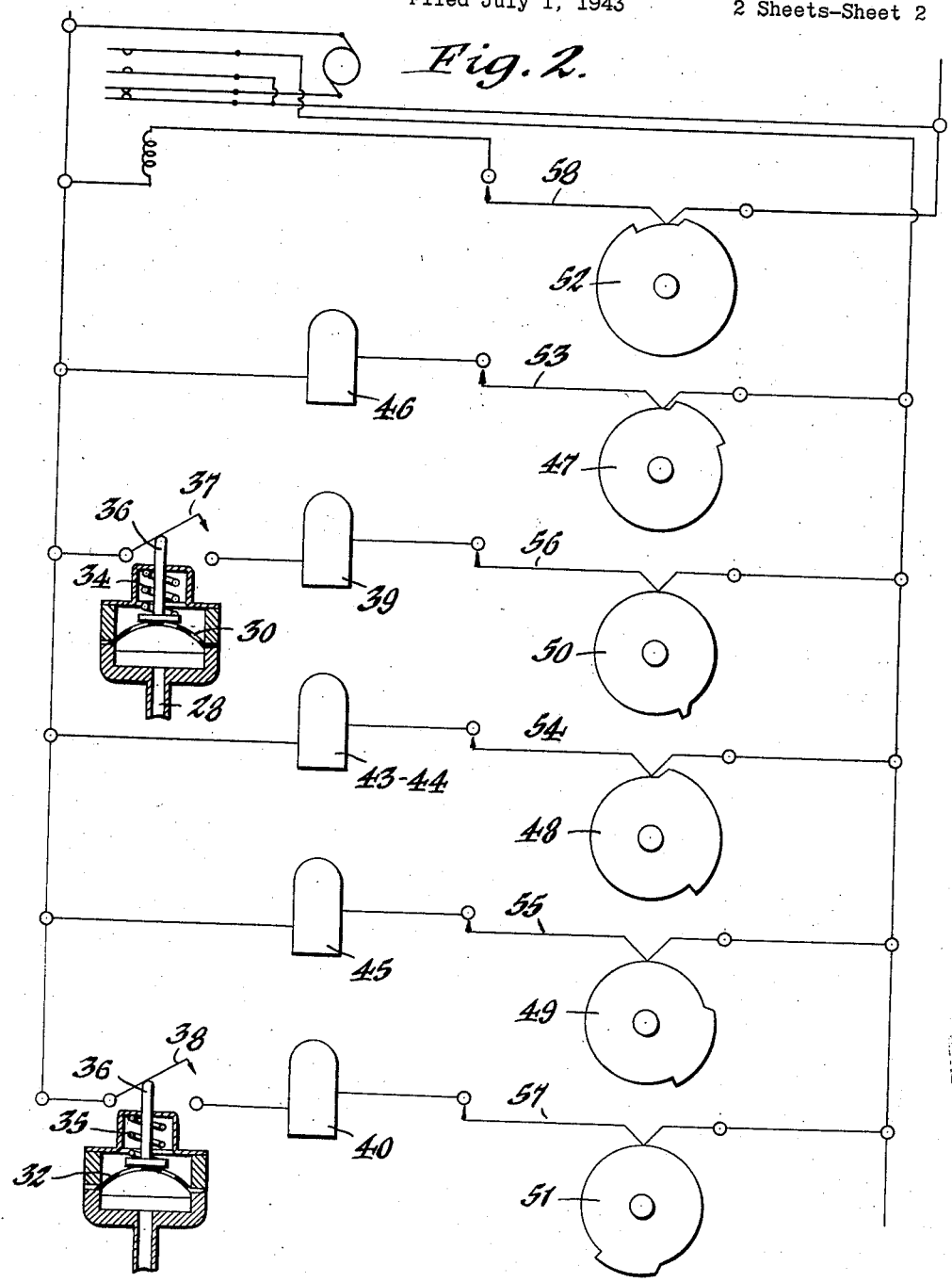

2,380,884

UNITED STATES PATENT OFFICE 2,380,884

DRINK MEASURING DEVICE

Walter Von Stoeser, North Tonawanda, and Fred H. Osborne, Snyder, N. Y., assignors to The Rudolph Wurlitzer Company, North Tonawanda, N. Y., a corporation of Ohio Application July 1, 1943, Serial No. 493,020

10 Claims. (Cl. 225—21)

This invention relates generally to the art of drink vending but more particularly to certain new and useful improvements in the drink metering or measuring device employed in connection therewith.

One of its objects is to provide a measuring device of this character which is so designed and constructed as to deliver to and dispense from a predetermined quantity of the beverage and in such a manner, in the case of a carbonated drink, that the charged content thereof will not be lost or dissipated and during the pouring of the beverage the usual attending turbulence will be reduced to a minimum.

Another object of the invention is to provide a dual-compartment vessel whose compartments are in valve-controlled communication, and wherein one of the compartments constitutes a measuring chamber from which the beverage is dispensed and the other constitutes and embodies means for governing the admission of a predetermined quantity of the beverage to the vessel.

Other features of the invention reside in the construction and arrangement of parts hereinafter described and particularly pointed out in the appended claims.

In the accompanying drawings:

Figure 1 is a sectional view of the measuring device embodying our invention. Figure 2 is a diagrammatic view of a form of timing mechanism employed for the filling and dispensing operations.

Similar characters of reference indicate corresponding parts throughout the several views.

This metering or measuring device has been primarily designed for use with refrigerated beverage dispensing apparatus of the coin-controlled type and wherein, upon the deposit of a coin, a predetermined amount of the beverage is automatically dispensed from the device into a paper cup or like receptacle.

In its preferred construction shown in the drawings, our measuring device consists of a beverage-receiving vessel or container 10 divided by a horizontal partition 11 into communicating upper and lower compartments 12 and 13, respectively, the partition having a port 14 therein to which is applied a downwardly-closing valve 15 having a stem 16 rising therefrom and guided in a bushing 17 fitted in the head of the vessel. The lower compartment 13 constitutes the measuring chamber and is of a size to receive a cupful or other amount of the beverage to be vended, being provided at its lower end with an inlet conduit 18 and an outlet conduit 19. The inlet conduit is adapted to be connected to a beverage supply tank and has a valve 20 interposed therein for controlling the delivery of a predetermined amount of the drink to the vessel, while the outlet conduit terminates in a pouring spout 21 and has a valve 22 therein for controlling the dispensing of the measured drink into a waiting cup. Adjacent its upper end the lower compartment has an atmospheric inlet 23 controlled by a valve 24, and extending axially downward from the partition-port 14 into this compartment is a tube 25 having vent openings 26 at its upper end for forcing the displaced air from the lower compartment into the upper compartment 12 during the filling or charging operation. This vent tube terminates above the bottom of the lower compartment and interposed in the resulting space and over the beverage intake is a baffle 27 which prevents surging of the drink as it enters and rises in the vessel.

The upper compartment 12 functions, through the medium of a fluid pressure introduced thereto, to govern the admission of a predetermined amount of the beverage to the vessel and for this purpose a pre-loading fluid pressure, such as air, is adapted to be delivered thereto through a pipe 28 in which is interposed a control valve 29 and a fluid pressure diaphragm 30 connected by a branch pipe 31 with the head end of the upper compartment of the vessel 10. A similar diaphragm 32 communicates with such compartment through a pipe 33. The diaphragm 30 is responsive to the pre-loading pressure admitted to the vessel while the companion diaphragm 32 is responsive to the higher pressure created by the delivery of the beverage thereto. These diaphragms are backed by coil springs 34 and 35, respectively, which normally urge them to a lowered position and which are of different tensions to cause the diaphragms to be lifted in response to the different low and maximum pressures existing in the compartment 12. Rising from each diaphragm is a thrust rod 36 whose upper end is disposed for operative engagement with a companion, normally-closed micro-switch 37 or 38 included in the circuits of corresponding solenoids 39 and 40 associated with control valves 29 and 20, respectively, for closing them when the diaphragms are lifted. Leading from the branch pipe 31 is an atmospheric inlet 41 controlled by a valve 42.

The atmospheric inlets 23 and 41 associated with the compartments 12 and 13, respectively, are normally closed and are adapted to be actuated to their open positions by companion solenoids 43 and 44. The partition-port valve 15 is likewise normally closed and is actuated to an open position by a solenoid 45. The dispensing valve 22 is adapted to be automatically opened at a predetermined time and for this purpose has a solenoid 46 associated therewith.

In practice, a timing mechanism of any suitable construction is employed for governing the opening of the solenoid-controlled drink-delivery and drink-dispensing valves 20 and 22, the solenoid-controlled atmospheric inlet valves 24 and 42, as well as for governing the solenoid-controlled, partition-port valve 15 and the fluid pressure delivery valve 29. A diagrammatic view of one form of timing mechanism is shown in Figure 2, wherein timing cams 47, 48, 49, 50 and 51 are provided which function to govern the opening and closing of companion switches 53, 54, 55, 56 and 57 included in the circuits of the respective solenoid-actuated valves. Inasmuch as the vent-controlling, solenoid-operated valves 24 and 42 are operated simultaneously, one cam 48 and one switch 54 have been shown associated with the solenoids 43, 44. Also included in this circuit is a cam 52 for controlling the on and off switch 58 of the device the circuit being initially established in any well known manner upon the deposit of a coin.

During the filling of the vessel with predetermined amount of the beverage, the fluid pressure delivery valve 29 is opened to admit a pre-loading pressure to the compartments 12 and 13 of the vessel, after which the diaphragm 30 is lifted to open the switch 37 and accordingly close such valve. The drink delivery valve 20 is now opened to deliver a measured quantity of the beverage to the vessel, the beverage rising to a level above the partition 11 until the pre-loading pressure is subjected to a predetermined pressure to cause the diaphragm 32 to be lifted to open the switch 38 and accordingly close the delivery valve. During this operation the partition valve 15 is caused to open by the rising liquid and by the displaced air pressure entering through the tube-vents 26 to permit the beverage to rise part way into the upper compartment 12, such valve closing by gravity, because of equal liquid pressures on opposite faces thereof, after the measured amount of the beverage has been admitted to the vessel and leaving the beverage in compartment 13 under hydraulic pressure.

When it is desired to pour the measured quantity of the beverage from the vessel, the solenoid-actuated dispensing valve 22 is opened, and immediately thereafter the atmospheric inlet valves 24 and 42 are opened to admit atmosphere for venting purposes to the compartments 12 and 13. As soon as the lower compartment is emptied of the measured drink therein, valve 22 is closed and thereafter valve 15 is opened to drain the contents of the upper compartment into the lower one, after which valves 24 and 42 are closed and the cycle recommences with the opening of the valve 29. The vessel may be completely drained of its contents by keeping valves 15, 22 and 42 opened. In case a larger drink is desired, the contents of both compartments 12 and 13 may be used and proper adjustments of the timing mechanism accordingly made to drain both compartments.

We claim as our invention:

1. A measuring device for beverages, comprising a vessel divided by a partition into communicating beverage compartments and having a valve therein for controlling the flow of the beverage from one compartment to the other, valved inlet and outlet conduits connected to one of the compartments for controlling the flow of beverage to and a measured quantity of the beverage from such compartment, normally-closed, valved air intakes in said compartments adjacent the upper ends thereof and adapted to be opened when the valved beverage outlet is opened, and fluid pressure controlled means in communication with the other compartment and operatively connected to said valved beverage inlet for controlling the amount of beverage delivered to the vessel.

2. A measuring device for beverages, comprising a vessel divided by a partition into communicating upper and lower beverage compartments and having a valve therein for controlling the flow of the beverage from one compartment to the other, valved vents in the upper portion of each compartment, valved inlet and outlet conduits connected to the lower compartment for controlling the flow of beverage to and a measured quantity of the beverage from the vessel, means in operative communication with the upper compartment for introducing a fluid pressure thereto, and means governed by the fluid pressure introduced into said upper compartment and operatively connected to the valved beverage inlet for controlling the amount of beverage delivered to the vessel.

3. A measuring device for beverages, comprising a vessel divided by a partition having a port therein defining intercommunicating compartments, one of said compartments constituting a measuring chamber and having valved inlet and outlet conduits connected thereto for controlling the flow of a predetermined amount of the beverage to and its discharge from the vessel, means including a control valve for introducing a fluid pressure to said vessel for predetermining the amount of beverage delivered thereto and including control devices in operative communication with the other compartment and responsive to the fluid pressure introduced thereto for governing at predetermined times the closing of the fluid pressure control valve and the valved beverage inlet, a valve applied to said partition-port and adapted to be opened and closed at predetermined times during the charging and discharging cycles, and valved vents for said compartments adapted to be opened during the discharging cycle.

4. A measuring device for beverages, comprising a vessel divided by a partition having a port therein defining intercommunicating compartments, one of said compartments constituting a measuring chamber and having valved inlet and outlet conduits connected thereto for controlling the flow of a predetermined amount of the beverage to and its discharge from the vessel, means including a control valve for introducing a fluid pressure to said vessel for predetermining the amount of beverage delivered thereto and including control devices in operative communication with the other compartment and responsive to the fluid pressure introduced thereto for governing at predetermined times the closing of the fluid pressure control valve and the valved beverage inlet, a normally-closed valve applied to said partition-port, valved vents for said compartments, and control devices operatively connected to said partition-valve, the beverage inlet and outlet valves, and the valves of said vents for controlling their opening at predetermined times.

5. A measuring device for beverages, comprising a vessel divided by a partition having a port therein defining intercommunicating compartments, one of said compartments constituting a measuring chamber and having valved inlet and outlet conduits connected thereto for the introduction and dispensing of the beverage and a valved port for the introduction of atmosphere, the other compartment having a valved inlet for the introduction of a fluid pressure medium for governing the amount of beverage delivered to the vessel, a valve applied to said partition-port for opening and closing the same, and fluid-pressure actuated means in communicating relation with said last-named compartment and operatively connected to the fluid-pressure valved inlet and the beverage valved inlet for controlling the closing of said valves at predetermined times.

6. A measuring device for beverages, comprising a vessel divided by a horizontal partition having a port therein defining upper and lower intercommunicating compartments each having a valved port therein for the admission of atmosphere, valved inlet and outlet conduits connected to the lower compartment of the vessel for delivering the beverage to and dispensing it therefrom, a valved inlet conduit connected to the upper compartment for introducing a fluid pressure thereto, governing means responsive to the fluid pressure connected to said upper compartment for closing its valved inlet, a second governing means responsive to a higher pressure to which said fluid pressure is subjected by the admitted beverage and, operatively connected to the beverage inlet conduit valve for closing the same when a predetermined volume of the beverage has been delivered to the vessel, and a normally closed valve for controlling said partition-port, and means connected to said partition valve for opening it at predetermined times.

7. A measuring device for beverages, comprising a vessel divided by a horizontal partition having a port therein defining upper and lower intercommunicating compartments each having a valved port therein for the admission of atmosphere, valved inlet and outlet conduits connected to the vessel for delivering the beverage to and dispensing it therefrom, a pipe rising from a point adjacent the bottom of the lower compartment and extending to and in alinement with said partition-port and having vents adjacent its upper end, a downwardly-closing valve for the partition-port including means for effecting its opening, means associated with each of the valves of said atmospheric ports and with the valves of said beverage inlet and outlet for effecting the opening of such valves at predetermined times, means for introducing a predetermined volume of fluid pressure to said upper compartment and governing means in responsive communication to the fluid pressure in such upper compartment and operatively connected to the beverage inlet valve for closing the same when a predetermined volume of the beverage has been delivered to the vessel.

8. A measuring device for beverages, comprising a vessel divided by a partition into communicating upper and lower beverage-receiving compartments and having a valve therein for controlling the flow of the beverage from one compartment to the other, the lower compartment constituting a measuring chamber having a valved-controlled inlet for delivering the beverage thereto and a valve-controlled outlet for dispensing the beverage therefrom, the upper compartment constituting a means for governing, by a pre-loading fluid pressure, the admission of a predetermined quantity of the beverage to the vessel, said means including a valve-controlled fluid pressure inlet and diaphragm-governed devices operatively connected to the valve-controlled beverage inlet and said fluid pressure inlet for closing such inlets under predetermined pressure conditions existing in said upper compartment.

9. A measuring device for beverages, comprising a vessel divided by a partition having a port therein defining intercommunicating compartments, one of said compartments constituting a measuring chamber and having valved inlet and outlet conduits connected thereto for controlling the flow of the beverage to and its discharge from the vessel, means in operative communication with the other comparment for introducing a fluid pressure thereto, means governed by the fluid pressure introduced into said other compartment and operatively connected to the valved beverage inlet for controlling the amount of beverage delivered to the vessel, a valve applied to said partition-port and adapted to be opened and closed at predetermined times during the charging and discharging cycles, and valved vents in said compartments adapted to be opened during the discharging cycle.

10. A measuring device for beverages, comprising a vessel divided by a horizontal partition having a port therein defining upper and lower intercommunicating compartments each having a normally-closed valved port therein for the admission of atmosphere, means connected to said valved ports for opening them at predetermined times, valved inlet and outlet conduits connected to the lower compartment of the vessel for delivering the beverage to and dispensing it therefrom, governing means in communicating relation with the head pressure in said upper compartment and operatively connected to the inlet conduit valve for closing the same when a predetermined volume of the beverage has been delivered to the vessel, a downwardly-closing valve for said partition-port and normally held in a closed position by gravity, means connected to said partition-port valve for effecting its opening, and means for initiating the opening of such last-named valve subsequent to the dispensing of the beverage from the lower compartment for draining any beverage in the upper compartment to the lower compartment.

WALTER VON STOESER.
FRED H. OSBORNE.